US012204870B2

(12) United States Patent
Saxe

(10) Patent No.: US 12,204,870 B2
(45) Date of Patent: Jan. 21, 2025

(54) NATURAL LANGUAGE ANALYSIS OF A COMMAND LINE USING A MACHINE LEARNING MODEL TO GENERATE A NATURAL LANGUAGE DESCRIPTION OF THE COMMAND LINE

(71) Applicant: Sophos Limited, Abingdon (GB)

(72) Inventor: Joshua Daniel Saxe, Wichita, KS (US)

(73) Assignee: Sophos Limited, Abingdon (GB)

( * ) Notice: Subject to any disclaimer, the term of this patent is extended or adjusted under 35 U.S.C. 154(b) by 273 days.

(21) Appl. No.: 17/709,574

(22) Filed: Mar. 31, 2022

(65) Prior Publication Data

US 2023/0316005 A1    Oct. 5, 2023

(51) Int. Cl.
*G06F 40/56* (2020.01)
*G06F 9/455* (2018.01)
*G06F 40/12* (2020.01)

(52) U.S. Cl.
CPC .......... *G06F 40/56* (2020.01); *G06F 9/45512* (2013.01); *G06F 40/12* (2020.01)

(58) Field of Classification Search
CPC ....... G06F 40/56; G06F 40/12; G06F 9/45512
See application file for complete search history.

(56) References Cited

U.S. PATENT DOCUMENTS

| 5,276,789 A | 1/1994 | Besaw et al. |
| 5,471,399 A | 11/1995 | Tanaka et al. |
| 5,793,974 A | 8/1998 | Messinger |
| 5,958,012 A | 9/1999 | Battat et al. |
| 6,225,999 B1 | 5/2001 | Jain et al. |
| 6,347,336 B1 | 2/2002 | Song et al. |
| 6,714,976 B1 | 3/2004 | Wilson et al. |
| 6,885,387 B1 | 4/2005 | Machida |

(Continued)

FOREIGN PATENT DOCUMENTS

| CN | 103914657 A | 7/2014 |
| CN | 104504337 A | 4/2015 |

(Continued)

OTHER PUBLICATIONS

Fu et al., A Transformer-based Approach for Translating Natural Language to Bash Comments, 2021, IEEE, whole document (Year: 2021).*

(Continued)

*Primary Examiner* — Sonia L Gay
(74) *Attorney, Agent, or Firm* — COOLEY LLP

(57) ABSTRACT

In one or more embodiments, a command is repeatedly input a predetermined number of times into a machine learning model to generate a plurality of different natural language (NL) descriptions. The plurality of different NL descriptions are input into the machine learning model to generate a plurality of different check commands. A plurality of similarity metrics are determined by comparing each check command from the plurality of different check commands to the command. A check command from the plurality of different check commands that is most similar to the command is identified based on the plurality of similarity metrics. An NL description from the plurality of different NL descriptions is caused to be displayed, the NL description previously input into the machine learning model to generate the check command.

20 Claims, 7 Drawing Sheets

(56) References Cited

U.S. PATENT DOCUMENTS

| | | |
|---|---|---|
| 6,885,641 B1 | 4/2005 | Chan et al. |
| 7,155,514 B1 | 12/2006 | Milford |
| 7,194,769 B2 | 3/2007 | Lippmann et al. |
| 7,594,270 B2 | 9/2009 | Church et al. |
| 7,624,448 B2 | 11/2009 | Coffman |
| 7,934,257 B1 | 4/2011 | Kienzle et al. |
| 7,945,787 B2 | 5/2011 | Gassoway |
| 8,181,244 B2 | 5/2012 | Boney |
| 8,201,243 B2 | 6/2012 | Boney |
| 8,225,394 B2 | 7/2012 | Gassoway |
| 8,401,982 B1 | 3/2013 | Satish et al. |
| 8,418,250 B2 | 4/2013 | Morris et al. |
| 8,499,204 B2 | 7/2013 | Lovy et al. |
| 8,578,490 B2 | 11/2013 | Moran |
| 8,607,347 B2 | 12/2013 | Harris et al. |
| 8,719,932 B2 | 5/2014 | Boney |
| 8,726,389 B2 | 5/2014 | Morris et al. |
| 8,763,123 B2 | 6/2014 | Morris et al. |
| 8,779,921 B1 | 7/2014 | Curtiss |
| 8,805,995 B1 | 8/2014 | Oliver |
| 8,813,236 B1 | 8/2014 | Saha et al. |
| 8,856,505 B2 | 10/2014 | Schneider |
| 8,881,288 B1 | 11/2014 | Levy et al. |
| 9,141,790 B2 | 9/2015 | Roundy et al. |
| 9,185,124 B2 | 11/2015 | Chakraborty |
| 9,189,634 B2 | 11/2015 | Lin |
| 9,235,716 B1 | 1/2016 | Brucker et al. |
| 9,390,263 B2 | 7/2016 | Thomas |
| 9,392,015 B2 | 7/2016 | Thomas |
| 9,411,953 B1 | 8/2016 | Kane et al. |
| 9,413,721 B2 | 8/2016 | Morris et al. |
| 9,419,989 B2 | 8/2016 | Harris et al. |
| 9,516,052 B1 | 12/2016 | Chauhan et al. |
| 9,571,512 B2 | 2/2017 | Ray et al. |
| 9,578,045 B2 | 2/2017 | Jaroch et al. |
| 9,602,530 B2 | 3/2017 | Ellis et al. |
| 9,690,938 B1 | 6/2017 | Saxe et al. |
| 9,727,726 B1 | 8/2017 | Allen |
| 9,736,182 B1 | 8/2017 | Madhukar et al. |
| 9,774,613 B2 | 9/2017 | Thomas et al. |
| 9,842,219 B1 | 12/2017 | Gates et al. |
| 9,898,604 B2 | 2/2018 | Fang et al. |
| 9,917,851 B2 | 3/2018 | Ray |
| 9,917,859 B2 | 3/2018 | Harris et al. |
| 9,934,378 B1 | 4/2018 | Hotta et al. |
| 9,940,459 B1 | 4/2018 | Saxe |
| 9,965,627 B2 | 5/2018 | Ray et al. |
| 9,967,282 B2 | 5/2018 | Thomas et al. |
| 9,967,283 B2 | 5/2018 | Ray et al. |
| 10,061,922 B2 | 8/2018 | Altman et al. |
| 10,075,462 B2 | 9/2018 | Mehta et al. |
| 10,078,571 B2 | 9/2018 | Altman et al. |
| 10,120,998 B2 | 11/2018 | Ghosh et al. |
| 10,122,687 B2 | 11/2018 | Thomas et al. |
| 10,122,753 B2 | 11/2018 | Thomas |
| 10,181,034 B2 | 1/2019 | Harrison et al. |
| 10,205,735 B2 | 2/2019 | Apostolopoulos |
| 10,257,224 B2 | 4/2019 | Jaroch et al. |
| 10,284,587 B1 | 5/2019 | Schlatter et al. |
| 10,284,591 B2 | 5/2019 | Giuliani et al. |
| 10,333,962 B1 | 6/2019 | Brandwine et al. |
| 10,397,261 B2 | 8/2019 | Ikuse et al. |
| 10,440,036 B2 | 10/2019 | Pal et al. |
| 10,489,587 B1 | 11/2019 | Kennedy et al. |
| 10,581,886 B1 | 3/2020 | Sharifi Mehr |
| 10,599,844 B2 | 3/2020 | Schmidtler et al. |
| 10,791,131 B2 | 9/2020 | Nor et al. |
| 10,887,331 B2 | 1/2021 | Nomura et al. |
| 10,938,838 B2 | 3/2021 | Saxe et al. |
| 10,972,485 B2 | 4/2021 | Ladnai et al. |
| 11,016,964 B1 | 5/2021 | Hinegardner et al. |
| 11,183,175 B2 | 11/2021 | Larson et al. |
| 11,269,872 B1 | 3/2022 | Moo et al. |
| 11,620,379 B1 | 4/2023 | Hegde et al. |
| 11,755,974 B2 | 9/2023 | Saxe et al. |
| 2002/0113816 A1 | 8/2002 | Mitchell et al. |
| 2003/0046390 A1 | 3/2003 | Ball et al. |
| 2003/0146929 A1 | 8/2003 | Baldwin et al. |
| 2003/0159069 A1 | 8/2003 | Choi et al. |
| 2003/0172294 A1 | 9/2003 | Judge |
| 2004/0064545 A1 | 4/2004 | Miyake |
| 2005/0055641 A1 | 3/2005 | Machida |
| 2005/0071482 A1 | 3/2005 | Gopisetty et al. |
| 2005/0262569 A1 | 11/2005 | Shay |
| 2007/0150957 A1 | 6/2007 | Hartrell et al. |
| 2008/0134142 A1 | 6/2008 | Nathan et al. |
| 2009/0044024 A1 | 2/2009 | Oberheide et al. |
| 2009/0077664 A1 | 3/2009 | Hsu et al. |
| 2009/0300166 A1 | 12/2009 | Chen et al. |
| 2009/0328210 A1 | 12/2009 | Khachaturov et al. |
| 2010/0287229 A1 | 11/2010 | Hauser |
| 2011/0016208 A1 | 1/2011 | Jeong et al. |
| 2011/0023120 A1 | 1/2011 | Dai et al. |
| 2011/0196964 A1 | 8/2011 | Natarajan et al. |
| 2011/0246753 A1 | 10/2011 | Thomas |
| 2012/0198806 A1 | 8/2012 | Shay et al. |
| 2013/0036472 A1 | 2/2013 | Aziz |
| 2013/0117848 A1 | 5/2013 | Golshan et al. |
| 2013/0179460 A1 | 7/2013 | Acuña et al. |
| 2014/0040245 A1 | 2/2014 | Rubinstein et al. |
| 2014/0075557 A1 | 3/2014 | Balabine et al. |
| 2014/0143825 A1 | 5/2014 | Behrendt et al. |
| 2014/0181805 A1 | 6/2014 | Zaitsev |
| 2014/0223563 A1 | 8/2014 | Durie et al. |
| 2014/0325650 A1 | 10/2014 | Pavlyushchik |
| 2014/0359768 A1 | 12/2014 | Miliefsky |
| 2015/0096025 A1 | 4/2015 | Ismael |
| 2015/0293954 A1 | 10/2015 | Hsiao et al. |
| 2015/0294244 A1 | 10/2015 | Bade et al. |
| 2015/0310213 A1 | 10/2015 | Ronen et al. |
| 2015/0312267 A1 | 10/2015 | Thomas |
| 2015/0319261 A1 | 11/2015 | Lonas et al. |
| 2016/0055337 A1 | 2/2016 | El-Moussa |
| 2016/0078225 A1 | 3/2016 | Ray et al. |
| 2016/0127401 A1 | 5/2016 | Chauhan et al. |
| 2016/0173510 A1 | 6/2016 | Harris et al. |
| 2016/0191554 A1 | 6/2016 | Kaminsky |
| 2016/0215933 A1 | 7/2016 | Skelton et al. |
| 2016/0218933 A1 | 7/2016 | Porras et al. |
| 2016/0283715 A1 | 9/2016 | Duke et al. |
| 2016/0292016 A1 | 10/2016 | Bussard et al. |
| 2016/0292579 A1 | 10/2016 | Parikh et al. |
| 2017/0031565 A1 | 2/2017 | Chauhan et al. |
| 2017/0063896 A1 | 3/2017 | Muddu et al. |
| 2017/0063899 A1 | 3/2017 | Muddu et al. |
| 2017/0063903 A1 | 3/2017 | Muddu et al. |
| 2017/0083703 A1 | 3/2017 | Abbasi et al. |
| 2017/0118228 A1 | 4/2017 | Cp et al. |
| 2017/0134397 A1 | 5/2017 | Dennison et al. |
| 2017/0244762 A1 | 8/2017 | Kinder et al. |
| 2017/0339178 A1 | 11/2017 | Mahaffey et al. |
| 2017/0346835 A1 | 11/2017 | Thomas et al. |
| 2017/0359373 A1 | 12/2017 | Jaladi et al. |
| 2018/0091535 A1 | 3/2018 | Chrosziel et al. |
| 2018/0096146 A1 | 4/2018 | Hao et al. |
| 2018/0203998 A1 | 7/2018 | Maisel et al. |
| 2018/0219888 A1 | 8/2018 | Apostolopoulos |
| 2018/0253458 A1 | 9/2018 | Goyal et al. |
| 2018/0357266 A1 | 12/2018 | Zenger et al. |
| 2019/0007435 A1 | 1/2019 | Pritzkau et al. |
| 2019/0034410 A1 | 1/2019 | Hudson et al. |
| 2019/0034540 A1 | 1/2019 | Perkins et al. |
| 2019/0034624 A1 | 1/2019 | Chen et al. |
| 2019/0050567 A1 | 2/2019 | Chistyakov et al. |
| 2019/0068627 A1 | 2/2019 | Thampy |
| 2019/0114539 A1 | 4/2019 | Chistyakov et al. |
| 2019/0121973 A1 | 4/2019 | Li et al. |
| 2019/0205322 A1 | 7/2019 | Dobrynin et al. |
| 2019/0220595 A1 | 7/2019 | Gehweiler et al. |
| 2019/0260779 A1 | 8/2019 | Bazalgette et al. |
| 2019/0260804 A1 | 8/2019 | Beck et al. |
| 2019/0311297 A1 | 10/2019 | Gapper |
| 2019/0318089 A1 | 10/2019 | Wang |
| 2019/0342330 A1 | 11/2019 | Wu et al. |

(56) References Cited

U.S. PATENT DOCUMENTS

| | | |
|---|---|---|
| 2019/0384897 A1 | 12/2019 | Urmanov et al. |
| 2020/0074078 A1 | 3/2020 | Saxe et al. |
| 2020/0074336 A1 | 3/2020 | Saxe et al. |
| 2020/0074360 A1 | 3/2020 | Humphries et al. |
| 2020/0076833 A1 | 3/2020 | Ladnai et al. |
| 2020/0076834 A1 | 3/2020 | Ladnai et al. |
| 2020/0233960 A1 | 7/2020 | Copty et al. |
| 2020/0301916 A1 | 9/2020 | Nguyen et al. |
| 2020/0304528 A1 | 9/2020 | Ackerman et al. |
| 2021/0049158 A1 | 2/2021 | Jiao et al. |
| 2021/0211440 A1 | 7/2021 | Saxe et al. |
| 2021/0211441 A1 | 7/2021 | Humphries et al. |
| 2021/0250366 A1 | 8/2021 | Ladnai et al. |
| 2021/0406253 A1 | 12/2021 | Agarwal |
| 2022/0217166 A1 | 7/2022 | Ladnai et al. |
| 2022/0217167 A1 | 7/2022 | Saxe et al. |
| 2022/0292085 A1 | 9/2022 | Shahriar et al. |
| 2022/0382527 A1* | 12/2022 | Wang .................. G06F 18/214 |
| 2022/0414228 A1 | 12/2022 | Difonzo et al. |
| 2023/0106226 A1 | 4/2023 | Bahrami et al. |
| 2023/0146197 A1 | 5/2023 | Raman et al. |
| 2023/0185915 A1 | 6/2023 | Rao et al. |
| 2023/0315722 A1 | 10/2023 | Saxe et al. |
| 2023/0315856 A1 | 10/2023 | Lee et al. |
| 2023/0403286 A1 | 12/2023 | Saxe |
| 2024/0037477 A1 | 2/2024 | Ladnai et al. |
| 2024/0062133 A1 | 2/2024 | Saxe et al. |
| 2024/0112115 A1 | 4/2024 | Ladnai et al. |

FOREIGN PATENT DOCUMENTS

| | | |
|---|---|---|
| CN | 112395602 A | 2/2021 |
| EP | 3340570 A1 | 6/2018 |
| GB | 2587966 A | 4/2021 |
| JP | H0997150 A | 4/1997 |
| JP | 2009176132 A | 8/2009 |
| JP | 2017004233 A | 1/2017 |
| KR | 20090102001 A | 9/2009 |
| RU | 2659737 C1 | 7/2018 |
| WO | WO-2014152469 A1 | 9/2014 |
| WO | WO-2018086544 A1 | 5/2018 |
| WO | WO-2023187319 A1 | 10/2023 |

OTHER PUBLICATIONS

Lin et al., Program Synthesis from Natural Language Using Recurrent Neural Networks, 2017, University of Washington Department of Computer Science and Engineering, Seattle, WA, USA, Tech. Rep. UW-CSE-17-03 1, whole document (Year: 2017).*
Agarwal et al., NeurIPS 2020 NLC2CMD Competition: Translating Natural Language to Bash Commands, 2021, Proceedings of Machine Learning Research 133:302{324,, whole document (Year: 2021).*
Raval, Generation of Linux Commands Using Natural Language Descriptions, 2918, Georgia Institute of Technology, whole document (Year: 2018).*
Hu et al., Deep Code Comment Generation, 2018, ACM/IEEE, whole document (Year: 2018).*
Song et al., A Survey of Automatic Generation of Source Code Comments: Algorithms and Techniques=, 2019, IEEE, whole document (Year: 2019).*
Shin et al., A survey of automatic code generation from natural language, 2021, Journal of Information Processing Systems, whole document (Year: 2021).*
[Author Unknown] "GPT-3". Wikipedia, Feb. 16, 2022, [Online] Retrieved from the Internet, https://web.archive.org/web/20220224001844/https:/en.wikipedia.org/wiki/GPT-3, 9 pages.
[Author Unknown] "Sigma". SigmaHQ, Feb. 22, 2022, [Online] Retrieved from the Internet, https://archive.org/details/github.com-SigmaHQ-sigma_-_2022-02-22_18-10-22, 11 pages.
Lawton, George, "Exploring GPT-3 architecture", TechTarget, Jul. 15, 2021, [Online] Retrieved from the Internet, https://www.techtarget.com/searchenterpriseai/feature/Exploring-GPT-3-architecture, 5 pages.

International Search Report and Written Opinion for International Application No. PCT/GB2023/051290, mailed on Oct. 2, 2023, 16 pages.
Office Action for Great Britain Application No. GB2303441 dated Aug. 31, 2023, 4 pages.
Padala, V., et al., "A noise filtering algorithm for event-based asynchronous change detection image sensors on truenorth and its implementation on truenorth", Frontiers in Neuroscience (2018); 12(118): 1-14.
Van De Erve, J., "Managing IIS Log File Storage" github (May 30, 2014) [online] https://github.com/MicrosoftDocs/iis-docs/blob/main/iis/manage/provisioning-and-managing-iis/managing-iis-log-file-storage.md (Access Date: Nov. 1, 2023); 5 pages.
International Search Report and Written Opinion for International Application No. PCT/GB2023/050650, dated May 22, 2023, 15 pages.
Examination Report for Great Britain Patent Application No. GB2303438.2 mailed Aug. 9, 2024, 4 pages.
Examination Report for Great Britain Patent Application No. GB2303441.6 dated Aug. 7, 2024, 6 pages.
Examination Report for Great Britain Patent Application No. GB2303438.2 dated Sep. 15, 2023, 5 pages.
"Counterclaim-Defendants' Preliminary Invalidity Contentions Against Counterclaim Plaintiff Sophos Ltd", United States District Court Western District of Texas Waco Division Nov. 23, 2022, 59 Pages.
Duan, Y., et al., "Detective: Automatically Identify and Analyze Malware Processes in Forensic Scenarios via DLLs", IEEE ICC 2015—Next Generation Networking Symposium (2015); pp. 5691-5969.
Eberle, W., et al., "Insider Threat Detection Using a Graph-Based Approach", Journal of Applied Security Research (2010); 6: 32-81 [online] https://eecs.wsu.edu/~holder/pubs/EberleJASR11.pdf; 90 Pages.
"Exhibit B-01 Invalidity of U.S. Pat. No. 9,967,267 Under AIA Section 102 or 103 in view of U.S. Pat. No. 10,440,036 ("Pal")", United States District Court Western District of Texas Waco Division Nov. 23, 2022, 163 Pages.
"Exhibit B-02 Invalidity of U.S. Pat. No. 9,967,267 Under AIA Section 102 or 103 in view of U.S. Patent No. 9,736, 182 B1 ("Madhukar")", United States District Court Western District of Texas Waco Division Nov. 23, 2022, 146 Pages.
"Exhibit B-03 Invalidity of U.S. Pat. No. 9,967,267 Under AIA Section 102 or 103 in view of U.S. Patent Application Publication US 2015/0264062 ("Hagiwara")", United States District Court Western District of Texas Waco Division Nov. 23, 2022, 171 Pages.
"Exhibit B-04 Invalidity of U.S. Pat. No. 9,967,267 Under AIA Section 102 or 103 in view of U.S. Pat. No. 9,225,730 ("Brezinski")", United States District Court Western District of Texas Waco Division Nov. 23, 2022, 185 Pages.
"Exhibit B-05 Invalidity of U.S. Pat. No. 9,967,267 Under AIA Section 102 or 103 in view of U.S. Pat. No. 9,225,730 ("Li")", United States District Court Western District of Texas Waco Division Nov. 23, 2022, 161 Pages.
"Exhibit B-06 Invalidity of U.S. Pat. No. 9,967,267 Under AIA Section 102 or 103 in view of U.S. Pat. No. 10,397,261 ("Nomura")", United States District Court Western District of Texas Waco Division Nov. 23, 2022, 169 Pages.
"Exhibit B-07 Invalidity of U.S. Pat. No. 9,967,267 Under AIA Section 102 or 103 in view of U.S. Pat. No. 8,881,288 ("Nor")", United States District Court Western District of Texas Waco Division Nov. 23, 2022, 178 Pages.
"Exhibit B-08 Invalidity of U.S. Pat. No. 9,967,267 Under AIA Section 102 or 103 in view of Chinese Patent Application Publication No. CN 104504337 ("Tao")", United States District Court Western District of Texas Waco Division Nov. 23, 2022, 130 Pages.
"Exhibit B-09 Invalidity of U.S. Pat. No. 9,967,267 Under AIA Section 102 or 103 in view of U.S. Pat. No. 9,578,045 ("Jaroch")", United States District Court Western District of Texaswaco Division Nov. 23, 2022, 137 Pages.
"Exhibit B-10 Invalidity of U.S. Pat. No. 9,967,267 Under AIA Section 102 or 103 in view of U.S. Patent App. Publication No. 2011/0023120 ("Dai")", United States District Court Western District of Texaswaco Division Nov. 23, 2022, 144 pages.

(56) References Cited

OTHER PUBLICATIONS

"Exhibit B-103 Invalidity of U.S. Pat. No. 9,967,267 Obviousness Chart Under AIA 35 U.S.C. 103", United States District Court Western District of Texaswaco Division Nov. 23, 2022, 115 Pages.
"Exhibit B-11 Invalidity of U.S. Pat. No. 9,967,267 Under AIA Section 102 or 103 in view of Prior Art Products", United States District Court Western District of Texas Waco Division Nov. 23, 2022, 88 Pages.
Faruki, P., "Mining control flow graph as API call-grams to detect portable executable malware", Proceedings of the Fifth International Conference on Security of Information and Networks (Oct. 2012); pp. 130-137 [online] https://dl.acm.org/doi/10.1145/2388576.2388594; 8 Pages.
Gardiner, J., "Command & Control: Understanding, Denying and Detecting", University of Birmingham (Feb. 2014); 38 pages.
Jha, S., et al., "Two Formal Analyses of Attack Graphs", Proceedings 15th IEEE Computer Security Foundations Workshop. CSFW-15., IEEE (2002) [online] https://citeseerx.ist.psu.edu/document?repid=rep1&type=pdf&doi=9dc8a70b13dfeb7318de291c858c2d65f1ddbd5f; 15 pages.
King, S., et al., "Backtracking Intrusions", Department of Electrical Engineering and Computer Science, University of Michigan, Proceedings of the nineteenth ACM symposium on Operating systems principles (Oct. 2003); 14 pages.
Manadhata, P., "Detecting Malicious Domains via Graph Inference", Proceedings of the 2014 Workshop on Artificial Intelligent and Security Workshop, ESORICS 2014, Part 1, LNCS 8712 (2014); 18 pages.
Marak, V., "Machine Learning Part 3: Ranking", Infosec (Apr. 4, 2013) [online] https://resources.infosecinstitute.com/topics/machine-learning-and-ai/machine-learningpart-3-ranking (Access Date: Sep. 23, 2023); 6 pages.
Non-Final Office Action for U.S. Appl. No. 17/710,036 dated May 24, 2024, 28 pages.
Non-Final Office Action for U.S. Appl. No. 17/710,127 dated Apr. 2, 2024, 8 pages.
Notice of Allowance for U.S. Appl. No. 17/710,127 mailed Jun. 27, 2024, 9 pages.
Office Action and Search Report for Great Britain Patent Application No. GB2303438.2 dated Feb. 9, 2024, 2 pages.
Office Action for Great Britain Application No. GB2303441 dated Feb. 2, 2024, 4 pages.
Ranade, P., et al., "CyBERT: Contextualized Embeddings for the Cybersecurity Domain", 2021 IEEE International Conference on Big Data (Big Data) (2021); 3334-3342.
Rice, A., et al., "Command-and-control servers: The puppet masters that govern malware", TechTarget (Jun. 2014) [online] https://www.techtarget.com/searchsecurity/feature/Command-and-control-servers-The-puppet-masters-that-govern-malware (Access Date: Feb. 22, 2023); 7 Pages.
Van De Erve, J., "Managing IIS Log File Storage" Microsoft Docs (May 3, 20140) [online] https://docs.microsoft.com/en-us/iis/manage/provisioning-and-managing-iis/managing-iis-log-file-storage (Access Date: Apr. 15, 2020); 9 pages.
Wang, P., et al., "An Advanced Hybrid Peer-to-Peer Botnet", School of Electrical Engineering and Computer Science, University of Central Florida, IEEE (Jul. 2008); 15 pages.
Yin, H., et al., "Panorama: capturing system-wide information flow for malware detection and analysis", Proceedings of the 14th ACM conference on Computer and Communications Security (Oct. 2007); 12 pages. DOI/10.1145/1315245.1315261.
Zhu, N., et al., "Design, Implementation, and Evaluation of Repairable File Service", Proceedings of the 2003 International Conference on Dependable Systems and Networks (2003); 10 pages.
Non-Final Office Action for U.S. Appl. No. 17/746,471 mailed Sep. 9, 2024, 30 pages.

\* cited by examiner

* [*] Explanation (Quality: 0.4838709677419355):
This command's purpose is to run the netstat command on the remote computer, and to generate a text report of the active network connections. The command is executed in the C:\Windows\SYstem32\Wbem\WMIC.exe command-line interpreter on the remote computer. The command is run under the credentials of the user trendSA. The command is run on the remote computer, 10.144.200.30. The command is run with the password g0urm3t. The command generates a text report of the active network connections. The command generates a text report of the active network connections.
*

FIG. 2

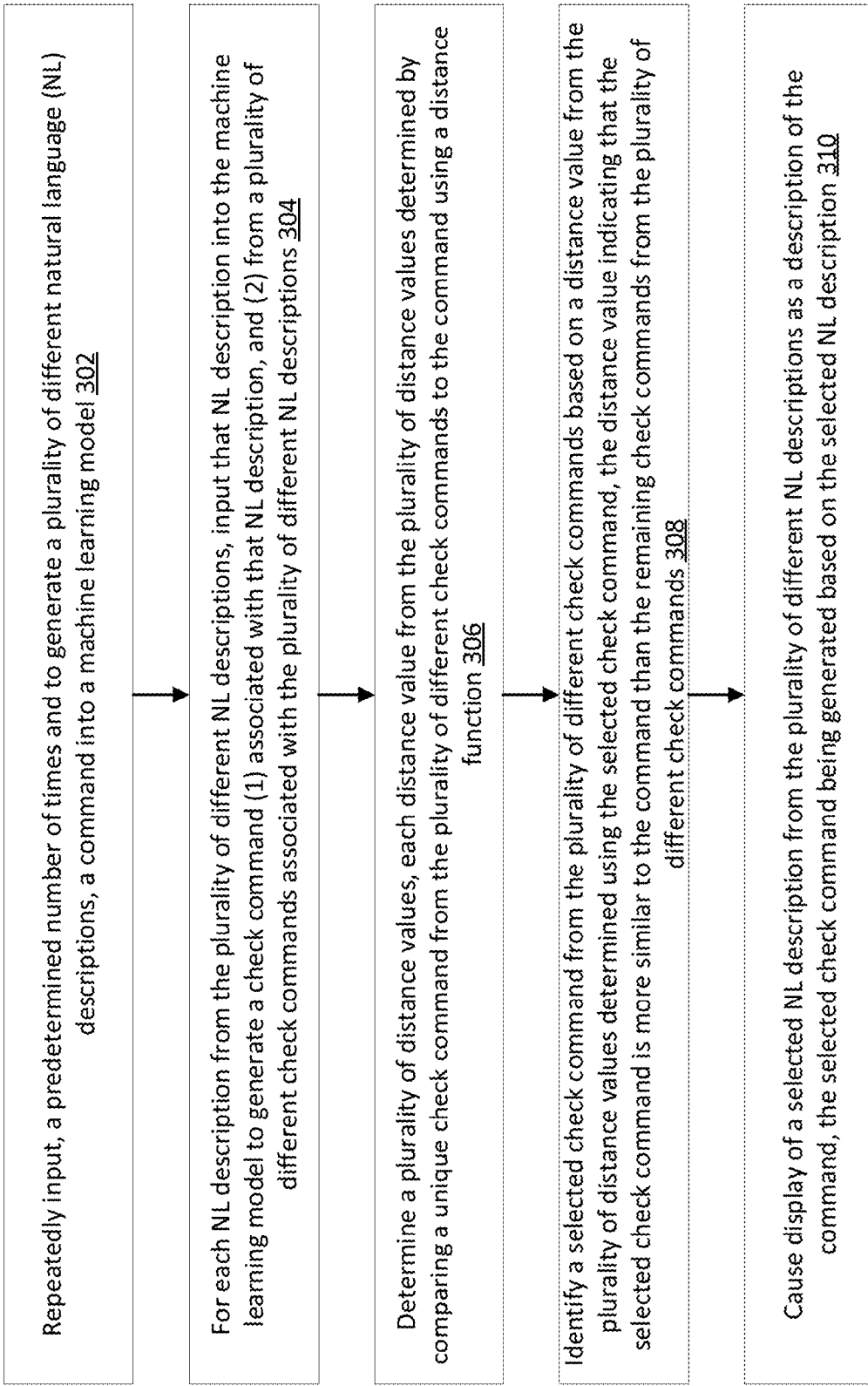

400

Input, via one or more processors, a command into a machine learning model to generate a first natural language (NL) description 402

Input, via the one or more processors, the command into the machine learning model to generate a second NL description 404

Input, via the one or more processors, the first NL description into the machine learning model to generate a first check command 406

Input, via the one or more processors, the second NL description into the machine learning model to generate a second check command 408

Determine, via the one or more processors, a first similarity metric indicating similarity between the first check command and the command 410

Determine, via the one or more processors, a second similarity metric indicating similarity between the second check command and the command 412

Determine, via the one or more processors and based on the first similarity metric and the second similarity metric, that the first check command is more similar to the command than the second check command is to the command 414

Cause, via the one or more processors, display of the first NL description, and not the second NL description, as a description of the command 416

FIG. 4

NATURAL LANGUAGE ANALYSIS OF A COMMAND LINE USING A MACHINE LEARNING MODEL TO GENERATE A NATURAL LANGUAGE DESCRIPTION OF THE COMMAND LINE

BACKGROUND

In one or more embodiments, natural language analysis of a command line using a machine learning model generates a natural language description of the command line.

Computing commands, such as a command prompt input into a command line interface, can sometimes be desirable to understand. For example, in a cybersecurity context, a cybersecurity analyst may desire to understand a computing command that was performed by a user to evaluate a potential risk associated with that computing command and/or user. For example, a cybersecurity analyst may want to determine a likelihood of maliciousness of a command line. Many cybersecurity analysts, however, do not have the knowledge to understand the computing command under analysis at a desirable level. Because commands can be complex and/or hard to decipher, even analysts having prior experience with computing commands may not have a desirable level of understanding of that command. As a result, a cybersecurity analyst may, for example, flag an event that may not need to have been flagged and/or not flag an event that should have been flagged.

SUMMARY

In some embodiments, an apparatus includes a memory including computer-executable instructions. The apparatus further includes one or more hardware processors in communication with the memory that, having executed the computer-executable instructions, are configured to repeatedly input, a predetermined number of times and to generate a plurality of different natural language (NL) descriptions, a command into a machine learning model. For each NL description from the plurality of different NL descriptions, that NL description is input into the machine learning model to generate a check command (1) associated with that NL description, and (2) from a plurality of different check commands associated with the plurality of different NL descriptions. A plurality of distance values are determined, each distance value from the plurality of distance values determined by comparing a unique check command from the plurality of different check commands to the command using a distance function. A selected check command from the plurality of different check commands is identified based on a distance value from the plurality of distance values and associated with the selected check command. The distance value can indicate that the selected check command is more similar to the command than the remaining check commands from the plurality of different check commands. A selected NL description from the plurality of different NL descriptions is caused to be displayed as a description of the command, where the selected check command was generated based on the selected NL description.

In some embodiments, a method includes inputting, via one or more processors, a command into a machine learning model to generate a first natural language processing (NL) description. The command is input, via the one or more processors, into the machine learning model to generate a second NL description. The first NL description is input, via the one or more processors, into the machine learning model to generate a first check command. The second NL description is input, via the one or more processors, into the machine learning model to generate a second check command. A first similarity metric is determined, via the one or more processors, indicating similarity between the first check command and the command. A second similarity metric is determined, via the one or more processors, indicating similarity between the second check command and the command. A determination is made, via the one or more processors and based on the first similarity metric and the second similarity metric, that the first check command is more similar to the command than the second check command is to the command. The first NL description, and not the second NL description, is caused, via the one or more processors, to be displayed as a description of the command.

In some embodiments, a non-transitory processor-readable medium stores code representing instructions to be executed by one or more processors, the instructions comprising code to cause the one or more processors to repeatedly input a predetermined number of times, via a processor and to generate a plurality of different natural language processing (NL) descriptions, a command into a machine learning model. The plurality of different NL descriptions are input, via the one or more processors, into the machine learning model to generate a plurality of different check commands. A plurality of similarity metrics are determined, via the one or more processors, by comparing each check command from the plurality of different check commands to the command. A check command from the plurality of different check commands that is most similar to the command is identified via the one or more processors and based on the plurality of similarly metrics. Display of an NL description from the plurality of different NL descriptions is caused via the one or more processors, the NL description previously input into the machine learning model to generate the check command.

BRIEF DESCRIPTION OF THE DRAWINGS

FIG. 2 shows an example NL description and associated quality score for a command, according to an embodiment.

FIG. 3 shows a flowchart of a method for causing display of an NL description for a command selected from multiple different NL descriptions associated with that command, according to an embodiment.

FIG. 4 shows a flowchart of a method for causing display of an NL description for a command selected from multiple different NL descriptions associated with that command, according to an embodiment.

DETAILED DESCRIPTION

In some implementations, a user (e.g., cybersecurity analyst, a programmer, a student, a manager, etc.) is provided with a natural language (NL) description of a command (e.g., a command line). One or more machine learning (ML)

models (e.g., a language model) can be used to generate multiple different NL descriptions potentially contextualizing (e.g., describing) the command. Thereafter, each NL description from the multiple different NL descriptions can be input into the one or more ML models to generate a check command associated with that NL description. Each of the generated check commands can be compared to the command (e.g., using a distance function) to determine the check command most similar to the command. The NL description generated based on the check command most similar to the command can then be provided to the user as an NL description of the command.

Some techniques described herein can allow a user to understand a command quickly and efficiently. Rather than, for example, asking someone else for an explanation of the command or putting forth cognitive effort to decipher the command themselves, a user, with or without prior experience of deciphering commands, can be shown an NL, human-like description of that command; a better understanding of that command can allow the user to make quicker and/or better-informed decisions (e.g., compared to asking someone else for an explanation of that command or putting forth cognitive effort to decipher that command themselves). For example, a cybersecurity analyst can receive an NL description of a command quickly and with minimal effort, saving that cybersecurity analyst time, effort, and/or the like. In the context of cybersecurity, it can sometimes be desirable to determine that a command is malicious as soon as possible to reduce risk and/or damage; moreover, it can sometimes be desirable to determine that a command is not malicious as soon as possible to reduce false positives.

Figure 1A:
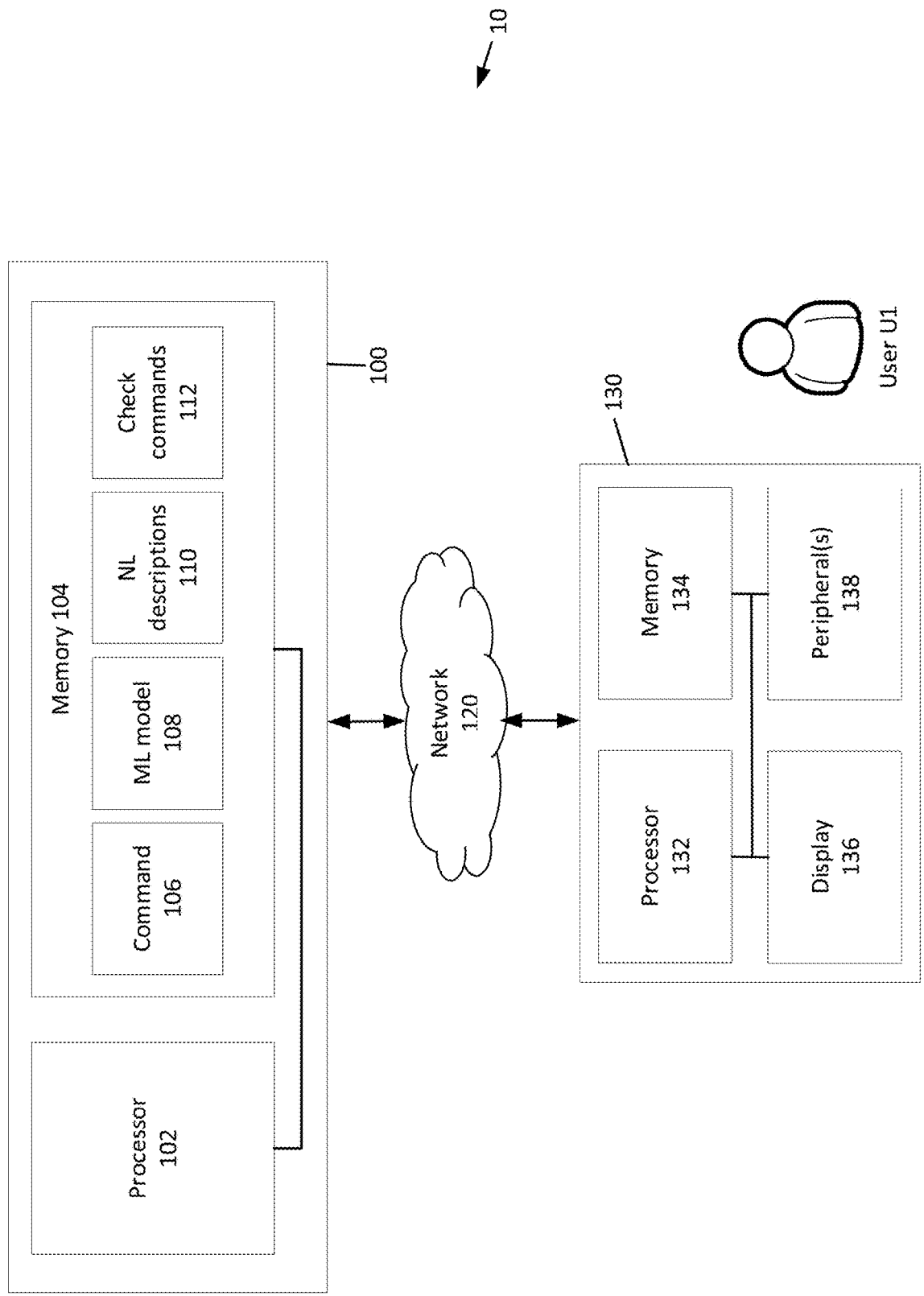
FIG. 1A shows a block diagram of a system for generating a natural language (NL) description of a command, according to an embodiment.

FIG. 1A shows a block diagram of a system 10 for generating an NL description of a command, according to an embodiment. The system 10 can include a description generation system 100 and a user compute device 130, each operatively coupled to one another via a network 120.

The network 120 can be any suitable communications network for transferring data, operating over public and/or private networks. For example, the network 120 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 120 can be a wireless network such as, for example, a Wi-Fi or wireless local area network ("WLAN"), a wireless wide area network ("WWAN"), and/or a cellular network. In other instances, the network 120 can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS). The communications sent via the network 120 can be encrypted or unencrypted. In some instances, the communication network 120 can include multiple networks or subnetworks operatively coupled to one another by, for example, network bridges, routers, switches, gateways and/or the like (not shown).

The user compute device 130 can include a processor 132, memory 134, display 136, and peripheral(s) 138, each operatively coupled to one another (e.g., via a system bus). In some implementations, the user compute device 130 is associated with (e.g., owned by, accessible by, operated by, etc.) a user U1. The user U1 can be any type of user, such as, for example, a student, programmer, or cybersecurity analyst.

The processor 132 of the user compute device 130 can be, for example, a hardware based integrated circuit (IC) or any other suitable processing device configured to run and/or execute a set of instructions or code. For example, the processor 132 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 132 can be operatively coupled to the memory 134 through a system bus (for example, address bus, data bus and/or control bus).

The memory 134 of the user compute device 134 can be, for example, a random-access memory (RAM), a memory buffer, a hard drive, a read-only memory (ROM), an erasable programmable read-only memory (EPROM), and/or the like. In some instances, the memory 134 can store, for example, one or more software programs and/or code that can include instructions to cause the processor 132 to perform one or more processes, functions, and/or the like. In some embodiments, the memory 134 can include extendable storage units that can be added and used incrementally. In some implementations, the memory 134 can be a portable memory (e.g., a flash drive, a portable hard disk, and/or the like) that can be operatively coupled to the processor 132. In some instances, the memory 134 can be remotely operatively coupled with a compute device (not shown). For example, a remote database device can serve as a memory and be operatively coupled to the compute device.

The peripheral(s) 138 can include any type of peripheral, such as an input device, an output device, a mouse, keyboard, microphone, touch screen, speaker, scanner, headset, printer, camera, and/or the like. In some instances, the user U1 can use the peripheral(s) 138 to indicate a command for which a NL description is desired. For example, the user U1 may type the command using a keyboard included in peripheral(s) 138 to indicate the command and/or select the command using a mouse included in peripherals(s) 138 to indicate the command.

The display 136 can any type of display, such as a Cathode Ray tube (CRT) display, Liquid Crystal Display (LCD), Liquid Emitting Diode (LED) display, Organic Light Emitting Diode (OLED) display, and/or the like. The display 136 can be used for visually displaying information (e.g., NL descriptions, command line, etc.) to user U1. For example, display 136 can display a NL description of a command. An example of an output that can be displayed by the display 136 is shown at FIG. 2.

The description generation system 100 can include a processor 102 and memory 104, each operatively coupled to one another (e.g., via a system bus). The memory 104 can include representations of a command 106, an ML model 108, NL descriptions 110, and check commands 112. In some implementations, the user compute device 130 is associated with (e.g., owned by, accessible by, operated by, etc.) an organization, and the description generation system 100 is associated with (e.g., owned by, accessible by, operated by, etc.) the same organization. In some implementations, the user compute device 130 is associated with (e.g., owned by, accessible by, operated by, etc.) a first organization, and the description generation system 100 is associated with (e.g., owned by, accessible by, operated by, etc.) a second organization different than the first organization.

The processor 102 of the description generation system 100 can be, for example, a hardware based integrated circuit (IC) or any other suitable processing device configured to run and/or execute a set of instructions or code. For example, the processor 102 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 102 can be operatively coupled to the memory 104 through a system bus (e.g., address bus, data bus and/or control bus).

The memory 106 of the description generation system 100 can be, for example, a random-access memory (RAM), a memory buffer, a hard drive, a read-only memory (ROM), an erasable programmable read-only memory (EPROM), and/or the like. In some instances, the memory 104 can store, for example, one or more software programs and/or code that can include instructions to cause the processor 102 to perform one or more processes, functions, and/or the like. In some embodiments, the memory 104 can include extendable storage units that can be added and used incrementally. In some implementations, the memory 104 can be a portable memory (for example, a flash drive, a portable hard disk, and/or the like) that can be operatively coupled to the processor 102. In some instances, the memory 104 can be remotely operatively coupled with a compute device (not shown). For example, a remote database device can serve as a memory and be operatively coupled to the compute device.

The description generation system 100 can receive a representation of the command 106 from the user compute device 130. The command 106 can indicate a computing task to be performed (e.g., by user compute device 130 and/or a different compute device not shown in FIG. 1A). The command 106 can be, for example, a command prompt command, a command line, MS-DOS command, control panel command, and/or the like. In some implementations, the command 106 is input by a user (e.g., user U1 and/or a different user not shown in FIG. 1A) to a compute device (e.g., compute device 130 and/or a different compute device not shown in FIG. 1A) using a command-line interface (e.g., shell).

In an example scenario, the user U1 is attempting to further understand a command. For example, the user U1 may not desirably understand what the command is/does. As a result, the user U1 uses the user compute device 130 to indicate the command for which additional information (e.g., a NL description) is requested. An indication of that command can be sent to the description generation system 100 and stored in memory 104 as command 106.

The command 106 can be input, multiple times, into the ML model 108 to generate NL descriptions 110 that attempt to describe the command 106. In some implementations, the ML model 108 is fuzzy (and not deterministic) such that inputting the same command (e.g., command 106) into the ML model 108 can generate multiple different outputs (e.g., NL descriptions 110). In some implementations, the ML model 108 is a neural network, language model, and/or a deep learning autoregressive language model (e.g., GPT-3). In some implementations, the ML model 108 was trained using multiple commands as input learning data, and associated NL descriptions of each command from the multiple commands as target learning data.

The NL descriptions 110 can include multiple different (i.e., unique) NL descriptions of the command 106. For example, each description from the NL descriptions 110 can be an attempted description, in natural language (e.g., using complete and/or partial sentences) and generated by the ML model 108, of what the command 106 is and/or does. The ML model 108 may not always generate the same NL description of the command 106. Similarly stated, the ML model 108 may not be deterministic. Thus, some descriptions included in NL descriptions 110 may describe command 106 more desirably (e.g., more completely, more accurately, etc.) than other descriptions included in NL descriptions 110.

The NL descriptions 110 can be input to the ML model 108 to generate check commands 112. Each check command from the check commands 112 can be compared to (i.e., checked against) the command 106 for similarity. Thereafter, the NL description from NL descriptions 110 that was used to generate the check command most similar to command 106 can be identified. Thus, each check command from the check commands 112 can be associated with (e.g., generated based on) an NL description from NL descriptions 110. The check command 112 can be, for example, a command prompt command, MS-DOS command, control panel command, and/or the like. Check commands 112 can include multiple different commands. At least one check command from check commands 112 can be identical to the command 102, or alternatively, none of the check commands are identical to the command 106.

As previously mentioned, each check command from the check commands 112 can be compared to the command 106 to determine the check command most similar to the command 106. In some implementations, a distance function can be used to compare each check command from the check commands 112 to the command 106. Furthermore, in some implementations, a quality metric (i.e., a quality metric value) can be determined based on output from the distance function, where the quality metric can indicate how similar a particular check command from check commands 112 is to the command 106. In some implementations, the distance function uses an algorithm chosen from at least one of: Hamming, Levenshtein, Darnerau-Levenshtein, Jaro-Winkler, Strcmp95, Needleman-Wunsch, Gotoh, Smith-Waterman, MLIPNS, Jaccard index, Sorensen-Dice coefficient, Tversky index, Overlap coefficient, Tanimoto distance, Cosine similarity, Bag distance, Longest common subsequence similarity, Longest common substring similarity, Ratcliff-Obershelp similarity, MRA, Soundex, Mataphone, NYSIIS, Editex, Prefix similarity, Postfix similarity, Length distance, Identity similarity, Monge-Elkan and/or the like.

Upon determining the check command from check commands 112 most similar (e.g., smallest difference, smallest distance, least number of changes, etc.) to command 106 (i.e., the selected check command), the NL description from NL descriptions 110 associated with (e.g., that was used to generate) the selected check command can be sent to the user compute device 130 (e.g., via network 120) and displayed on display 136 to user U1 (see, e.g., FIG. 2). Note that the selected check command may be identical to command 106, or may not be identical to command 106.

Furthermore, in some implementations, the quality metric and/or command 106 can also be caused to be displayed via display 136 to user U1. Thus, from user U1's perspective, compute device 130 can display the command 106, an NL description of command 106 (that was used to generate the selected check command), and/or a quality metric indicating how well the NL description of command 106 describes command 106.

In some implementations, upon determining the selected check command, the quality score calculated for the NL description from NL descriptions 110 associated with (e.g., that was used to generate) the selected check command can be compared to a predetermined range or threshold (e.g., quality score of at least 80%, 90%, 95%, 99%, and/or the like). In some implementations, if the quality score is outside the predetermined range and/or less than the predetermined threshold, the description generation system 100 can refrain from causing the NL description from NL descriptions 110 to be displayed, or alternatively, cause a predetermined message to be shown (e.g., an error message, a default message, etc.); if, however, the quality score is within the predetermined range and/or greater than the predetermined threshold, the description generation system 100 can cause the NL description from NL descriptions 110 to be displayed. Alternatively, in some implementations, upon determining the NL description from NL descriptions 110 associated with the selected check command, that NL description can be caused to be displayed automatically without comparing to the predetermined range.

In some implementations, the command 106, NL descriptions 110, check commands 112, and/or quality metrics can be used to update and/or retrain ML model 108. For example, the command 106, check commands 112, and/or quality metrics can be used as input learning data, and the NL descriptions 110 can be used as target learning data. As a result, the ML model 108 can generate subsequent NL description that may be of higher quality.

Note that, although FIG. 1A is described with respect to causing display of a single NL description for a single command (i.e., command 106) as requested by a single compute device (i.e., user compute device 130), in some implementations, multiple different NL descriptions can be displayed for multiple different commands at one or more compute devices. For example, a first NL description for a first command can be displayed at a first compute device, and a second NL description (different than the first NL description) for a second command (different than the first command) can be displayed at the first compute device and/or a second compute device different than the first compute device.

Note that, although the ML model 108 is shown as being stored in memory 104 of the description generation system 100, in some implementations, the ML model 108 can be stored at a different compute device operatively coupled to the description generation system 100. In some implementations, an application programming interface (API) can be used to send input (e.g., command 106)/receive output (e.g., NL descriptions 110 and/or check commands 112) from the ML model 108 if stored at a remote compute device.

Figure 1B:
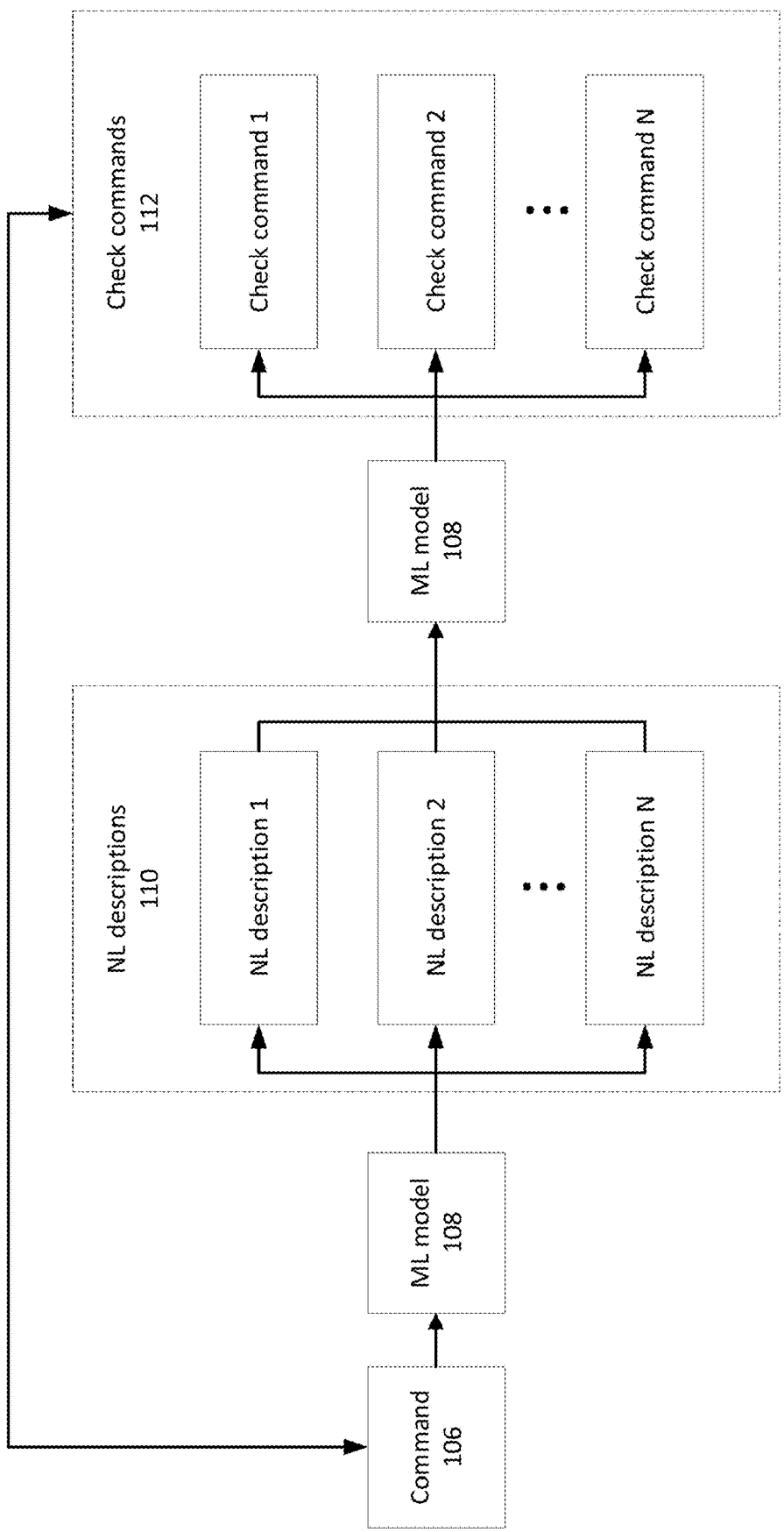
FIG. 1B shows a workflow for generating an NL description of a command, according to an embodiment.

FIG. 1B shows a workflow for generating an NL description of a command, according to an embodiment. The command 106 can be input into ML model 108 a predetermined number of times. The ML model 108 can generate NL descriptions 110. NL descriptions can include NL description 1, NL description 2, . . . , and NL description N. Each of the NL descriptions can then be input into ML model 108 to generate check commands 112. Check commands 112 can include check command 1, check command 2, . . . , and check command N. For example, NL description 1 can be input into ML model 108 to generate check command 1, NL description 2 can be input into ML model 108 to generate check command 2, and NL description N can be input into ML model to generate check command N. Thereafter, the check commands 112 can be compared to the command 106 using a distance function to determine the check command most similar to command 106. For example, check command 1 can be compared to command 106 to generate a first distance metric (i.e., a first distance metric value), check command 2 can be compared to command 106 to generate a second distance metric (i.e., a second distance metric value), and check command N can be compared to command 106 to generate an Nth distance metric (i.e., an Nth distance metric value). By analyzing the $1^{st}$-Nth distance metrics, the check command from check commands 112 most similar to command 106 (i.e., the selected check command) can be determined, and the NL description from NL descriptions 110 that was used to generate the selected check command (i.e., the selected NL description) can be identified as the NL description to be used for describing the command 106. For example, if the first distance metric indicated a similarity to command 106 more than the $2^{nd}$-Nth distance metrics, check command 1 can be the selected check command, and NL description 1 can be selected NL description used to describe command 106 in NL.

In some implementations, the distance metric calculated for the selected check command can be used to determine a quality metric indicating how complete and/or accurate the selected NL description is for the command 106. For example, the selected check command being more similar to the command 106 can cause the quality metric to indicate more completeness and/or accuracy of the selected NL description, while the selected check command being less similar to the command 106 can cause the quality metric to indicate less completeness and/or accuracy of the selected NL description. The quality metric can be, for example, a number between 0 to 1, 0 to 10, −1 to 1, −10 to 10, etc. The distance metric can be, for example, a number between 0 to 1, 0 to 10, −1 to 1, −10 to 10, etc.

Note that, although FIG. 1B includes at least three NL descriptions in NL descriptions 110 and at least three check commands in check commands 112, it can be appreciated that, in some implementations, less than three NL descriptions can be included in NL descriptions 110 and/or less than three check commands can be included in check commands 112.

Note that ML model 108 was used to generate NL descriptions 110 from command 106. Further note that ML model 108 can run in an opposite direction (e.g., inputs and outputs switched) to generate check commands 112 from NL descriptions 110. Also note that, in some implementations, multiple ML models can be used rather than using the same, single ML model. For example, a first ML model can be used to generate NL descriptions 110 from command 106, and a second ML model different than the first ML model can be used to generate check commands 112 from NL descriptions 110.

FIG. 2 shows an example of text that can be displayed on a display (e.g., display 136). The text includes an NL description of a particular command, as well as a quality metric associated with that description. From the perspective of a user attempting to better understand the particular command, the text shown in FIG. 2 can provide the user with an improved understanding of the particular command (e.g., compared to the user guessing on their own), and the quality metric can help the user to gauge how complete and/or accurate that description is. Note that the information from FIG. 2 (e.g., NL description and/or quality metric) can be displayed in any suitable form (e.g., graph, table, etc.).

FIG. 3 shows a flowchart of a method 300 for causing display of an NL description for a command selected from multiple different NL descriptions associated with that command, according to an embodiment. In some implementations, method 300 can be performed by a processor (e.g., processor 102 shown and described with respect to FIG. 1A).

At 302, a command (e.g., command 106) is repeatedly input, a predetermined number of times (e.g., two or more times) and to generate a plurality of different NL descriptions (e.g., NL descriptions), into a machine learning model (e.g., ML model 108). The command can be, for example, a command line about which a user (e.g., user U1) requests additional information. In some implementations, step 302 is performed (e.g., automatically and without requiring additional human input) in response to receiving a request from a compute device (e.g., user compute device 130) indicating an NL description of the command.

At 304, for each NL description from the plurality of different NL descriptions, that NL description in input into the machine learning model to generate a check command (1) associated with (e.g., generated based on) that NL description, and (2) from a plurality of different check commands (e.g., check commands 112) associated with (e.g., generated based on) the plurality of different NL descriptions. For example, as discussed with respect to FIG. 1B, NL description 1 from NL descriptions 110 can be input to ML model 108 to generate check command 1 from check commands 112 associated with NL description 1, NL description 2 from NL descriptions 110 can be input to ML model 108 to generate check command 2 from check commands 112 associated with NL description 2, and NL description N from NL descriptions 110 can be input to ML model 108 to generate check command N from check commands 112 associated with NL description N. In some implementations, step 304 can be performed automatically (e.g., without requiring human input) in response to completing step 302.

At 306, a plurality of distance values are determined, each distance value from the plurality of distance values determined by comparing a unique check command from the plurality of different check commands to the command using a distance function. For example, as discussed with respect to FIG. 1B, check command 1 can be compared to command 106 using the distance function to generate a first distance metric (i.e., first distance value), check command 2 can be compared to command 106 using the distance function to generate a second distance metric (i.e., second distance value), and check command N can be compared to command 106 using the distance function to generate an Nth distance metric (i.e., Nth distance value). In some implementations, step 306 can be performed automatically (e.g., without requiring human input) in response to completing step 304.

At 308, a selected check command from the plurality of different check commands is identified based on a distance value from the plurality of distance values determined using the selected check command. The distance value can indicate that the selected check command is more similar to the command than the remaining check commands from the plurality of different check commands. In some implementations, step 308 can be performed automatically (e.g., without requiring human input) in response to completing step 306.

At 310, a selected NL description from the plurality of different NL descriptions is caused to be displayed as a description of the command, the selected check command being generated based on the selected NL description. For example, one or more electronic signals can be sent to a compute device (e.g., user compute device 130 via network 120), and the compute device can be configured to display (e.g., using display 136) the selected NL description in response to receiving the one or more electronic signals. In some implementations, step 310 can be performed automatically (e.g., without requiring human input) in response to completing step 308.

In some implementations of method 300, the machine learning model is a deep learning autoregressive language model. For example, the machine learning model can be one of a GPT-3 model, GPT-2 model, or GPT-1 model. In some implementations of method 300, the machine learning model is one of an XLNet model or a BERT model.

Some implementations of method 300 further include causing display of a quality metric (i.e., quality metric value) associated with the NL description, the quality metric determined based on the distance value from the plurality of distance values associated with the selected check command. In some implementations, a lower distance value can indicate a higher quality metric, and a higher distance value can indicate a lower quality metric. In some implementations, the quality metric can be displayed along with the NL description. In some implementations, prior to the quality metric and/or selected NL description being caused to be displayed, a determination is made that the quality metric is within a predetermined acceptable range and/or greater than a predetermined threshold (e.g., quality greater than 50%, 75%, 80%, 90%, 95%, 99%, etc.).

Some implementations of method 300 further include retraining the machine learning model using the selected NL description and the selected check command. For example, the selected check command can be input learning data and the selected NL description can be target learning data. In some implementations, a quality metric associated with the NL description and selected check command is greater than predetermined quality threshold (e.g., quality greater 90%, 95%, 99%, etc.).

In some implementations of method 300, the selected check command is identical to the command. In some implementations of method 300, the selected check command is not identical to the command.

FIG. 4 shows a flowchart of a method 400 for causing display of an NL description for a command selected from multiple different NL descriptions associated with that command, according to an embodiment. In some implementations, method 400 can be performed by a processor (e.g., processor 102 shown and described with respect to FIG. 1A).

At 402, a command (e.g., command 106) is input into a machine learning model (e.g., ML model 108) to generate a first NL description (e.g., NL description 1). At 404, the command is input into the machine learning model to generate a second NL description (e.g., NL description 2). The first NL description and the second NL description can be different descriptions. In some implementations, step 404 can be performed automatically (e.g., without requiring human input) in response to completing step 402.

At 406, the first NL description is input into the machine learning model to generate a first check command (e.g., check command 1). In some implementations, step 406 can be performed automatically (e.g., without requiring human input) in response to completing step 404.

At 408, the second NL description is input into the machine learning model to generate a second check command (e.g., check command 2). The first check command and the second check command can be different check commands. In some implementations, step 408 can be performed automatically (e.g., without requiring human input) in response to completing step 406.

At 410, a first similarity metric indicating similarity between the first check command and the command is determined. In some implementations, step 410 can be performed automatically (e.g., without requiring human input) in response to completing step 408.

At 412, a second similarity metric indicating similarity between the second check command and the command is determined. The first similarity metric and the second similarity metric can use the same unit of measurement (e.g., distance, number of changes, etc.), but be different values. In some implementations, step 412 can be performed automatically (e.g., without requiring human input) in response to completing step 410.

At 414, a determination is made, based on the first similarity metric and the second similarity metric, that the first check command is more similar to the command than the second check command is to the command. In some implementations, step 414 can be performed automatically (e.g., without requiring human input) in response to completing step 412.

At 416, the first NL description, and not the second NL description, is caused to be displayed as a description of the command. For example, one or more electronic signals can be sent to a compute device (e.g., user compute device 130), and the compute device can be configured to display (e.g., using display 136) the first NL description in response to receiving the one or more electronic signals. In some implementations, step 416 can be performed automatically (e.g., without requiring human input) in response to completing step 414.

In some implementations of method 400, the first similarity metric is a first distance value determined using a distance function, the second similarity metric is second distance value determined using the distance function, and the first distance value is less than the second distance value.

In some implementations of method 400, the machine learning model is at least one of a Generative Pre-trained Transformer 3 (GPT-3) model, a Generative Pre-trained Transformer 2 (GPT-2) model, or a Generative Pre-trained Transformer 1 (GPT-1) model.

Some implementations of method 400 further include determining a quality metric associated with the first NL description based on the first similarity metric. The quality metric can indicate, for example, how complete and/or accurate the first NL description is at describing the command. Some implementations of method 400 further include causing display of the quality metric.

Some implementations of method 400 further include retraining the machine learning model using the first check command and the first NL description. For example, the first check command can be used as input learning data and the first NL description can be used as target learning data.

In some implementations of method 400, the first check command is identical to the command. In some implementations of method 400, the first check command is not identical to the command, and the second check command is not identical to the command.

Some implementations of method 400 further include determining, prior to the causing of the first NL description to be displayed, that the first similarity metric is within a predetermined acceptable range and/or above a predetermined threshold. For example, the predetermined acceptable range can be such that the first similarity metric indicates similarity between the first check command and the command that is at least 50%, 75%, 90%, 95%, 99%, and/or the like.

In some implementations of method 400, the command is a first command, and method 400 further includes inputting a second command into the machine learning model to generate a third natural NL description, the second command different than the first command. Additionally, the second command is input into the machine learning model to generate a fourth NL description. Additionally, the third NL description is input into the machine learning model to generate a third check command. Additionally, the fourth NL description is input into the machine learning model to generate a fourth check command. Additionally, a third similarity metric indicating similarity between the third check command and the second command is determined. Additionally, a fourth similarity metric indicating similarity between the fourth check command and the second command is determined. Additionally, a determination is made, based on the third similarity metric and the fourth similarity metric, that the third check command is more similar to the second command than the fourth check command is to the second command. Additionally, the third NL description, and not the fourth NL description, is caused to be displayed as description of the second command. In some implementations, a similar process can be performed for additional commands (e.g., a third command, a fourth command, etc.) different than the first command and second command.

Figure 5:
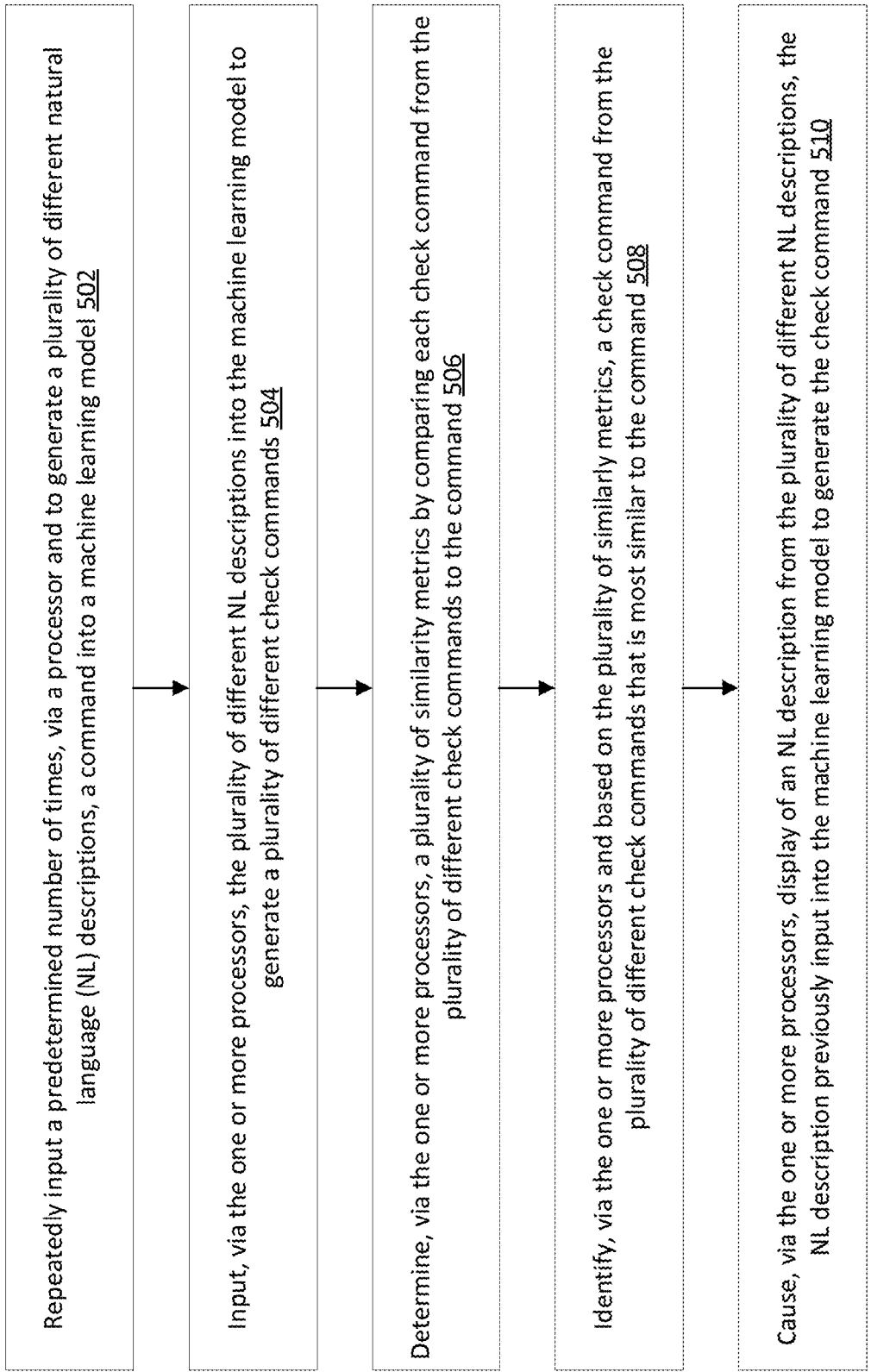
FIG. 5 shows a flowchart of a method for causing display of an NL description for a command selected from multiple different NL descriptions associated with that command, according to an embodiment.

FIG. 5 shows a flowchart of a method 500 for causing display of an NL description for a command selected from multiple different NL descriptions associated with that command, according to an embodiment. In some implementations, method 500 can be performed by a processor (e.g., processor 102 shown and described with respect to FIG. 1A).

At 502, a command (e.g., command 106) is repeatedly input, a predetermined number of times, into a machine learning model (e.g., ML model 108) to generate a plurality of different NL descriptions (e.g., NL descriptions 110). At 504, the plurality of different NL descriptions are input into the machine learning model to generate a plurality of different check commands (e.g., check commands 112). In some implementations, step 504 can be performed automatically (e.g., without requiring human input) in response to completing step 502.

At 506, a plurality of similarity metrics are determined by comparing each check command from the plurality of different check commands to the command. Each similarity metric from the plurality of similarity metrics can have different values. In some implementations, step 506 can be performed automatically (e.g., without requiring human input) in response to completing step 504.

At 508, a check command from the plurality of different check commands that is most similar to the command is identified based on the plurality of similarity metrics. In some implementations, step 508 can be performed automatically (e.g., without requiring human input) in response to completing step 506.

At 510, an NL description from the plurality of different NL descriptions is caused to be displayed, the NL description previously input into the machine learning model to generate the check command. In some implementations, step 510 can be performed automatically (e.g., without requiring human input) in response to completing step 508.

Some implementations of method 500 further include causing display of a quality metric associated with the NL description. The quality metric can be determined based on a similarity metric from the plurality of similarity metrics associated with the selected check command.

Some implementations of method 500 further include retraining the machine learning model using the NL description and the check command. For example, the check command can be used as input learning data and NL description can be used as target learning data.

Figure 6:
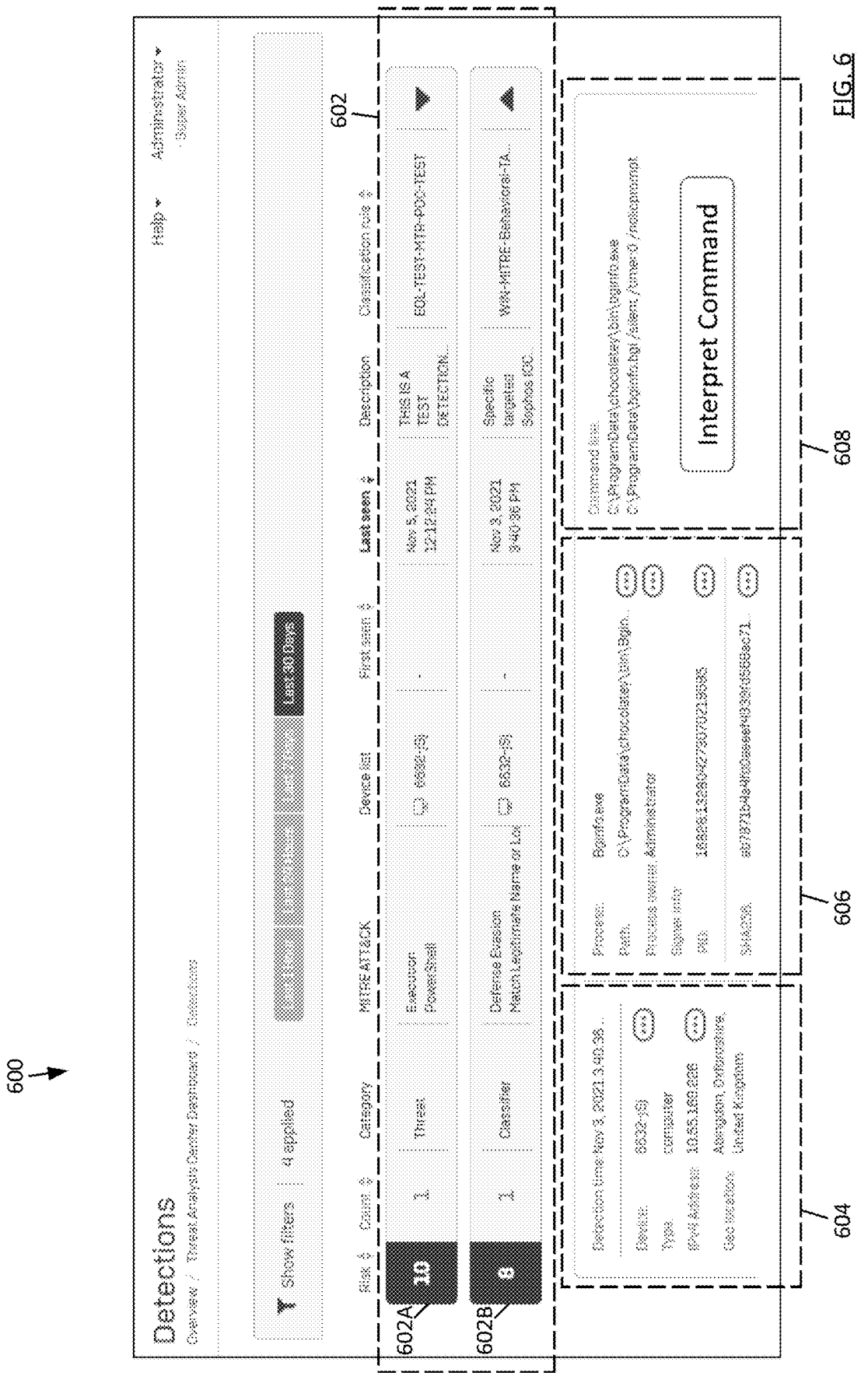
FIG. 6 shows an example of a Detections Console that an analyst can interface with to receive an NL description of one or more commands, according to an embodiment.

FIG. 6 shows an example of a Detections Console 600 that an analyst (e.g., cybersecurity analyst) can interface with to receive an NL description of one or more commands, according to an embodiment. In some implementations, the Detections Console 600 can be displayed via a display (e.g., display 136 shown and described with respect to FIG. 1A). The Detections Console 600 includes sections 602, 604, 606, and 608.

The Detections Console 600 can include information associated with one or more detections. A detection can refer to activity that may need additional investigation (e.g., by the analyst). In some implementations, a detection can refer to activity on a device (e.g., a compute device not shown in FIG. 1A) that is unusual and/or suspicious, but has not been blocked. The maliciousness of a detection may not yet be known. Detections can be identified and/or displayed to the analyst using a compute device (e.g., user compute device 130) based on analysis of activities at other compute devices being monitored (not shown in FIG. 1A). Thereafter, the analyst can further investigate a detection to determine maliciousness and/or a remedial action(s) (e.g., escalate, deescalate, etc.).

Section 602 includes two rows, each row including information associated with a different detection 602A, 602B. As shown at section 602, each of the two detections 602A, 602B can be associated with a risk, count, category, MITRE ATT&CK, device list, date/time first seen, date/time last seen, description, and/or classification rule.

Sections 604, 606, and 608 show additional information associated with the detection 602B. Section 604 lists a detection time, device, type, IPv4 address, and geolocation associated with a compute device that caused detection 602B. Section 606 shows a process, path, process owner, signer info, process id (e.g., PID), and hash (e.g., SHA256), to the extent that information is available, associated with detection 602B. Section 608 shows two command lines that were executed (e.g., by a user under surveillance) in connection with detection 602B. Section 608 also displays an "Interpret Command" option that the analyst may select to initiate generation and display of NL descriptions of the command lines shown in section 608. Selection of the "Interpret Command" option can initiate the processes described herein to generate and display the NL descriptions of the command lines. Viewing the NL descriptions of the command lines shown in section 608 can allow the analyst to make a more informed decision about detection 602B.

While the methods and apparatus are described herein as generating natural language descriptions of commands, in other instances a description generation system (such as description generation system 100 of FIG. 1A) can be used to generate natural language descriptions of any collection or stream of artifacts, events, objects, and/or data. As an example, a description generation system can process and/or classify an artifact such as, for example, any portable executable file(s), registry key(s), dataset(s), filepath(s), Uniform Resource Locator (URL), device(s), device behavior, user behavior, network behavior, network identifier, and/or entity represented and/or associated with computer-related resources. For further examples, an artifact can include a function of software code, a webpage(s), a data file(s), a model file(s), a source file(s), a script(s), a process, a binary executable file(s), a table(s) in a database system, a development deliverable(s), an active content(s), a word-processing document(s), an e-mail message(s), a text message, a network address, a device or entity (e.g., a network-connected compute device and/or computer system, a server, a smartphone, a tablet a laptop, a multimedia device, etc.), a network address (e.g., a Media Control (MAC) address, Internet Protocol (IP) address, etc.) of a compute device, and/or the like.

In some embodiments, an apparatus includes a memory including computer-executable instructions. The apparatus further includes one or more hardware processors in communication with the memory that, having executed the computer-executable instructions, are configured to repeatedly input, a predetermined number of times and to generate a plurality of different natural language (NL) descriptions, a command into a machine learning model. For each NL description from the plurality of different NL descriptions, that NL description is input into the machine learning model to generate a check command (1) associated with that NL description, and (2) from a plurality of different check commands associated with the plurality of different NL descriptions. A plurality of distance values are determined, each distance value from the plurality of distance values determined by comparing a unique check command from the plurality of different check commands to the command using a distance function. A selected check command from the plurality of different check commands is identified based on a distance value from the plurality of distance values and associated with the selected check command. The distance value can indicate that the selected check command is more similar to the command than the remaining check commands from the plurality of different check commands. A selected NL description from the plurality of differentNL descriptions is caused to be displayed as a description of the command, where the selected check command was generated based on the selected NL description.

In some implementations, the machine learning model is a deep learning autoregressive language model.

In some implementations, the one or more processors are further configured to cause display of a quality metric associated with the NL description. The quality metric can be determined based on the distance value from the plurality of distance values associated with the selected check command.

In some implementations, the one or more processors are further configured to retrain the machine learning model using the selected NL description and the selected check command.

In some implementations, the selected check command is identical to the command.

In some implementations, the selected check command is not identical to the command.

In some embodiments, a method includes inputting, via one or more processors, a command into a machine learning model to generate a first natural language processing (NL) description. The command is input, via the one or more processors, into the machine learning model to generate a second NL description. The first NL description is input, via the one or more processors, into the machine learning model to generate a first check command. The second NL description is input, via the one or more processors, into the machine learning model to generate a second check command. A first similarity metric is determined, via the one or more processors, indicating similarity between the first check command and the command. A second similarity metric is determined, via the one or more processors, indicating similarity between the second check command and the command. A determination is made, via the one or more processors and based on the first similarity metric and the second similarity metric, that the first check command is more similar to the command than the second check command is to the command. The first NL description, and not the second NL description, is caused, via the one or more processors, to be displayed as a description of the command.

In some implementations, the first similarity metric is a first distance value determined using a distance function, the second similarity metric is a second distance value determined using the distance function, and the first distance value is less than the second distance value.

In some implementations, the machine learning model is a Generative Pre-trained Transformer 3 (GPT-3) model.

Some implementations further include determining, via the one or more processors, a quality metric associated with the first NL description based on the first similarity metric. Some implementations further include causing, via the one or more processors, display of the quality metric.

Some implementations further include retraining the machine learning model using the first check command and the first NL description.

In some implementations, the first check command is identical to the command.

In some implementations, the first check command is not identical to the command, and the second check command is not identical to the command.

Some implementations further comprise determining, via the one or more processors and prior to the causing of the first NL description to be displayed, that the first similarity metric is within a predetermined acceptable range.

In some implementations, the command is a first command, and the method further includes inputting, via the one or more processors, a second command into the machine learning model to generate a third natural NL description. The second command can be different than the first command. The method can further include inputting, via the one or more processors, the second command into the machine learning model to generate a fourth NL description. The method can further include inputting, via the one or more processors, the third NL description into the machine learning model to generate a third check command. The method can further include inputting, via the one or more processors, the fourth NL description into the machine learning model to generate a fourth check command. The method can further include determining, via the one or more processors, a third similarity metric indicating similarity between the third check command and the second command. The method can further include determining, via the one or more processors, a fourth similarity metric indicating similarity between the fourth check command and the second command. The method can further include determining, via the one or more processors and based on the third similarity metric and the fourth similarity metric, that the third check command is more similar to the second command than the fourth check command is to the second command. The method can further include causing, via the one or more processors, display of the third NL description, and not the fourth NL description, as description of the second command.

In some embodiments, a non-transitory processor-readable medium stores code representing instructions to be executed by one or more processors, the instructions comprising code to cause the one or more processors to repeatedly input a predetermined number of times, via a processor and to generate a plurality of different natural language processing (NL) descriptions, a command into a machine learning model. The plurality of different NL descriptions are input, via the one or more processors, into the machine learning model to generate a plurality of different check commands. A plurality of similarity metrics are determined, via the one or more processors, by comparing each check command from the plurality of different check commands to the command. A check command from the plurality of different check commands that is most similar to the command is identified via the one or more processors and based on the plurality of similarly metrics. Display of an NL description from the plurality of different NL descriptions is caused via the one or more processors, the NL description previously input into the machine learning model to generate the check command.

In some implementations, the machine learning model is a deep learning autoregressive language model.

In some implementations, the code further comprises code to cause the one or more processors to cause, via the one or more processors, display of a quality metric associated with the NL description. The quality metric can be determined based on a similarity metric from the plurality of similarity metrics associated with the selected check command.

In some implementations, the code further comprises code to cause the one or more processor to retrain the machine learning model using the NL description and the check command.

In some implementations, the command is a command line.

It should be understood that the disclosed embodiments are not intended to be exhaustive, and functional, logical, operational, organizational, structural and/or topological modifications may be made without departing from the scope of the disclosure. As such, all examples and/or embodiments are deemed to be non-limiting throughout this disclosure.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments.

Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "of" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:
a memory comprising computer-executable instructions; and
one or more hardware processors in communication with the memory that, having executed the computer-executable instructions, are configured to:
in response to a detection, repeatedly input, a predetermined number of times and to generate a plurality of different natural language (NL) descriptions, a command into a machine learning model, the command associated with the detection;
for each NL description from the plurality of different NL descriptions, input that NL description into the machine learning model to generate a check command (1) associated with that NL description, and (2) from a plurality of different check commands associated with the plurality of different NL descriptions;
determine a plurality of distance values, each distance value from the plurality of distance values determined by comparing a unique check command from the plurality of different check commands to the command using a distance function;
identify a selected check command from the plurality of different check commands based on a distance value from the plurality of distance values determined using the selected check command, the distance value indicating that the selected check command is more similar to the command than the remaining check commands from the plurality of different check commands; and
cause display of a selected NL description from the plurality of different NL descriptions as a description of the command.

2. The apparatus of claim 1, wherein the machine learning model is a deep learning autoregressive language model.

3. The apparatus of claim 1, wherein the one or more hardware processors are further configured to:
cause a display of a quality metric associated with the selected NL description, the quality metric determined based on the distance value from the plurality of distance values associated with the selected check command.

4. The apparatus of claim 1, wherein the one or more hardware processors are further configured to:
retrain the machine learning model using the selected NL description and the selected check command.

5. The apparatus of claim 1, wherein the selected check command is identical to the command.

6. The apparatus of claim 1, wherein the selected check command is not identical to the command.

7. A method, comprising:
in response to a detection, inputting, via one or more processors, a command into a machine learning model to generate a first natural language (NL) description, the command associated with the detection;
inputting, via the one or more processors, the command into the machine learning model to generate a second NL description;
inputting, via the one or more processors, the first NL description into the machine learning model to generate a first check command;
inputting, via the one or more processors, the second NL description into the machine learning model to generate a second check command;
determining, via the one or more processors, a first similarity metric indicating similarity between the first check command and the command;
determining, via the one or more processors, a second similarity metric indicating similarity between the second check command and the command;
determining, via the one or more processors and based on the first similarity metric and the second similarity metric, that the first check command is more similar to the command than the second check command is to the command; and
causing, via the one or more processors, display of the first NL description, and not the second NL description, as a description of the command.

8. The method of claim 7, wherein the first similarity metric is a first distance value determined using a distance function, the second similarity metric is a second distance value determined using the distance function, and the first distance value is less than the second distance value.

9. The method of claim 7, wherein the machine learning model is a Generative Pre-trained Transformer 3 (GPT-3) model.

10. The method of claim 7, further comprising:
determining, via the one or more processors, a quality metric associated with the first NL description based on the first similarity metric; and
causing, via the one or more processors, display of the quality metric.

11. The method of claim 7, further comprising:
retraining the machine learning model using the first check command and the first NL description.

12. The method of claim 7, wherein the first check command is identical to the command.

13. The method of claim 7, wherein the first check command is not identical to the command, and the second check command is not identical to the command.

14. The method of claim 7, further comprising:
determining, via the one or more processors and prior to the causing of the first NL description to be displayed, that the first similarity metric is within a predetermined acceptable range.

15. The method of claim 7, wherein the command is a first command, the method further comprising:
inputting, via the one or more processors, a second command into the machine learning model to generate a third NL description, the second command different than the first command;
inputting, via the one or more processors, the second command into the machine learning model to generate a fourth NL description;
inputting, via the one or more processors, the third NL description into the machine learning model to generate a third check command;
inputting, via the one or more processors, the fourth NL description into the machine learning model to generate a fourth check command;
determining, via the one or more processors, a third similarity metric indicating similarity between the third check command and the second command;

determining, via the one or more processors, a fourth similarity metric indicating similarity between the fourth check command and the second command;

determining, via the one or more processors and based on the third similarity metric and the fourth similarity metric, that the third check command is more similar to the second command than the fourth check command is to the second command; and causing, via the one or more processors, display of the third NL description, and not the fourth NL description, as description of the second command.

16. A non-transitory processor-readable medium storing code representing instructions to be executed by one or more processors, the instructions comprising code to cause the one or more processors to:

in response to a detection, repeatedly input a predetermined number of times, via a processor and to generate a plurality of different natural language (NL) descriptions, a command into a machine learning model, the command associated with the detection;

input, via the one or more processors, the plurality of different NL descriptions into the machine learning model to generate a plurality of different check commands;

determine, via the one or more processors, a plurality of similarity metrics by comparing each check command from the plurality of different check commands to the command;

identify, via the one or more processors and based on the plurality of similarity metrics, a check command from the plurality of different check commands that is most similar to the command; and cause, via the one or more processors, display of an NL description from the plurality of different NL descriptions, the NL description previously input into the machine learning model to generate the check command.

17. The non-transitory processor-readable medium of claim 16, wherein the machine learning model is a deep learning autoregressive language model.

18. The non-transitory processor-readable medium of claim 16, wherein the code further comprises code to cause the one or more processors to:

cause, via the one or more processors, display of a quality metric associated with the NL description, the quality metric determined based on a similarity metric from the plurality of similarity metrics associated with the check command.

19. The non-transitory processor-readable medium of claim 16, wherein the code further comprises code to cause the one or more processors to:

retrain the machine learning model using the NL description and the check command.

20. The non-transitory processor-readable medium of claim 16, wherein the command is a command line.

\* \* \* \* \*